UNITED STATES PATENT OFFICE 2,570,108

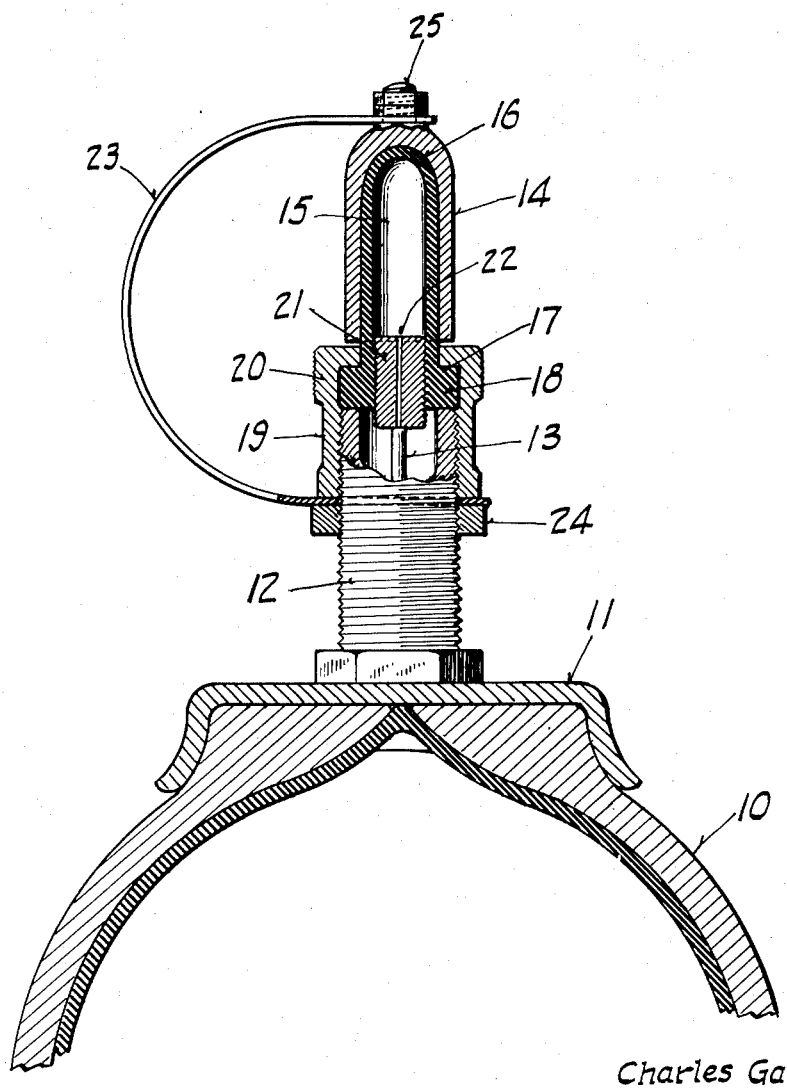
Charles Gallot
Arthur G. Olscheske
INVENTORS

SOFT TIRE INDICATOR

Charles Gallot, Milwaukee, and Arthur G. Olscheske, West Allis, Wis.

Application October 4, 1945, Serial No. 620,364

9 Claims. (Cl. 116—34)

This invention relates to soft tire indicators.

There has been a long felt need for a satisfactory device by which the driver of an automobile or other motor vehicle may be promptly and surely apprised of an under-inflated condition of his tires in order to insure against tire damage and other more serious consequences that commonly result from continued operation of tires inadequately inflated.

An object of the present invention is to provide a simple inexpensive device which may be readily applied to a conventional tire, without modification, and without interference with normal inflation of the tire, and which may be relied upon to promply indicate to the driver an under-inflated condition of the tire whenever that condition occurs.

Other more specific objects and advantages will appear, expressed or implied, from the following description of an illustrative embodiment of this invention.

The single figure of the accompanying drawings is a sectional view of a conventional tire equipped with a soft tire indicator constructed in accordance with the present invention.

The tire 10 is shown mounted on a conventional rim 11 and equipped with a standard valve stem 12 containing the usual spring loaded check valve whose plunger is shown at 13.

The soft tire indicator selected for illustration comprises an inverted cup-shaped member 14 normally carried by an expansible fluid pressure container 15 frictionally engaged therein. In this instance the container 15 is in the form of a cylindrical bag of rubber or other air tight elastic material having one end 16 permanently closed and the other end 17 open to the interior of the valve stem 12. The open end 17 of the bag is preferably thickened as at 18 to provide a sealing washer between the valve stem 12 and a suitable closure cap 19, the latter being screwed on to the stem 12 and having an opening in the head 20 thereof through which the bag 15 extends.

A plug 21, screwed or otherwise adjustably fixed in the open end 17 of the bag, normally reacts on the plunger 13 of the check valve to depress and maintain the latter in open position, so that the interior of the stem 12 is normally exposed to the air pressure within the tire. An appropriate duct 22 in the plug 21 normally transmits this air pressure to the interior of the bag 15, so that the pressure within the bag corresponds to that within the tire.

The arrangement is such that, so long as the air pressure in the tire remains above a predetermined minimum, the bag 15 is expanded against the interior of the cup 14 with sufficient pressure to frictionally retain the cup on the bag; but when the pressure in the tire, and consequently in the bag, falls below this minimum this gripping pressure is relieved and the cup is free to leave the bag.

Provision is preferably made for urging the cup 14 from the bag 15, and for this purpose a suitable spring is preferably employed. In this instance the spring shown is in the form of a strip 23 of spring steel securely anchored at one end on the stem 12, between the base of the cap 19 and an appropriate lock nut 24, and with its other end suitably attached to a stud 25 provided on the end of the cup 14. In the form of spring shown the strip 23 has been deflected from its normally straight condition and is thus tensioned or biased to urge the cup off of the bag 15.

It will of course be understood that when the pressure in the tire and in the bag 15 falls below a predetermined minimum, the spring 23 lifts the cup 14 from the bag 15 and projects the cup laterally beyond the tire where it is in a position, during continued operation of the tire, to strike the fender or other part of the vehicle and thus produce a repeated audible signal by which the driver is apprised of the under-inflated condition of his tire. Other audible or visible signals may of course be produced by providing on the vehicle suitable electrical contacts in position to be repeatedly struck by the released cup and through which a suitable bell or light circuit may be repeatedly energized during continued operation of the under-inflated tire.

It will be noted that by the foregoing arrangement a very simple and effective device has been provided which will at all times indicate whenever the tire has become under-inflated. With the car standing still a single glance at the indicator will be sufficient for the driver to know whether or not the tire is sufficiently inflated. Moreover, when inflation becomes necessary, the device shown does not in any way interfere with that process, since the cap 19 may at any time be readily removed and the tire inflated in the customary manner, after which it is necessary only to reapply the cap 19 in the usual way and to force the cup 14 back onto the bag 15.

Various changes may be made in the embodiment of the invention hereinabove specifically described without departing from or sacrificing the advantages of the invention as defined in the appended claims.

We claim:
1. A soft tire indicator comprising the combination of a radially expansible fluid pressure container, means for detachably mounting the same on a tire valve stem with the interior of said container exposed to the fluid pressure in the tire, and indicating means including an element engaging said container and releasably retained thereon by the fluid pressure therein.

2. A soft tire indicator comprising the combination of a radially expansible fluid pressure container, means for detachably mounting the same on a tire valve stem with the interior of said container exposed to the fluid pressure in the tire, indicating means including an element frictionally retained on said container by the fluid pressure in the latter, and resilient means for displacing said element from said container when the pressure in said container falls below a predetermined minimum.

3. A soft tire indicator comprising the combination of a radially expansible fluid pressure container, means for detachably mounting the same on a tire valve stem with the interior of said container exposed to the fluid pressure in the tire, indicating means including an element embracing said container and releasably retained thereon by the fluid pressure therein, and a spring adapted to be mounted on said stem and operable on said element to displace the same when the pressure in said container falls below a predetermined minimum.

4. A soft tire indicator for mounting on a tire valve stem, said indicator comprising a cap adapted to be screwed onto said stem, a radially expansible fluid pressure bag carried by said cap for communication with the fluid pressure in the tire, and indicating means including an element encircling said bag and frictionally retained on said bag by the fluid pressure therein.

5. A soft tire indicator for mounting on a tire valve stem, said indicator comprising a cap adapted to be screwed onto said stem, a radially expansible fluid pressure bag extending through said cap and having an open end fashioned to provide a sealing washer between said cap and stem and to provide communication between said bag and tire, and indicating means including an element enclosing said bag and frictionally retained on said bag by the fluid pressure in the latter.

6. A soft tire indicator for mounting on a tire valve stem, said indicator comprising a cap for application to said stem, a radially expansible fluid pressure bag extending through said cap and having an open end fashioned to provide a sealing washer between said cap and stem, a plug in the open end of said bag having means for maintaining communication between said bag and tire, and indicating means including an element embracing said bag and frictionally retained thereon by the fluid pressure therein whereby said element is releasable from said bag whenever the fluid pressure in said tire and bag falls below a predetermined minimum.

7. A soft tire indicator comprising the combination of a fluid pressure container, means for mounting the same on a tire valve stem with the interior of said container exposed to the fluid pressure in the tire, and indicating means including a displaceable element, said container having a yieldable wall portion pressed by the contained fluid pressure into frictional gripping engagement with said element to thereby retain said element against displacement relative to said wall portion so long as said fluid pressure exceeds a predetermined minimum.

8. A soft tire indicator comprising the combination of a fluid pressure container, means for mounting the same on a tire valve stem with the interior of said container exposed to the fluid pressure in the tire, and indicating means including a hollow element encircling said container, said container having a peripheral wall expandable under the contained fluid pressure into frictional gripping engagement with said element to thereby retain said element against displacement relative to said wall so long as the fluid pressure exceeds a predetermined minimum.

9. A soft tire indicator comprising an expansible bag forming a fluid pressure container, means for mounting said bag on a tire valve stem with the interior of said bag exposed to the pressure in the tire, and indicating means including a hollow element fitted over said bag and yieldably retained thereon by expansive pressure of said bag thereagainst but displaceable whenever the contained fluid pressure falls below a predetermined minimum.

CHARLES GALLOT.
ARTHUR G. OLSCHESKE.

REFERENCES CITED

The following references are of record in the file of this patent:

UNITED STATES PATENTS

| Number | Name | Date |
|---|---|---|
| 1,487,887 | Rich | Mar. 25, 1924 |
| 2,193,841 | Renner | Mar. 19, 1940 |